(12) United States Patent
Sugimoto (10) Patent No.: US 8,479,569 B2
(45) Date of Patent: Jul. 9, 2013

(54) MALFUNCTION DETERMINATION APPARATUS FOR COOLING APPARATUS AND MALFUNCTION DETERMINATION METHOD FOR COOLING APPARATUS

(75) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 280 days.

(21) Appl. No.: 12/953,586

(22) Filed: Nov. 24, 2010

(65) Prior Publication Data

US 2011/0120216 A1 May 26, 2011

(30) Foreign Application Priority Data

Nov. 24, 2009 (JP) ................................. 2009-266517

(51) Int. Cl.
*G01M 15/04* (2006.01)

(52) U.S. Cl.
USPC ...................................................... 73/114.68

(58) Field of Classification Search
USPC ......................................... 73/114.68, 114.77
See application file for complete search history.

(56) References Cited

U.S. PATENT DOCUMENTS

| | | | |
|---|---|---|---|
| 6,314,920 B1 * | 11/2001 | Suzuki et al. ................. | 123/41.1 |
| 6,321,696 B1 * | 11/2001 | Nishioka et al. ............ | 123/41.15 |
| 6,532,807 B1 * | 3/2003 | Krauss ........................ | 73/114.68 |
| 6,851,399 B2 * | 2/2005 | Herynek et al. ........... | 123/41.44 |
| 6,904,875 B2 * | 6/2005 | Kilger ........................ | 123/41.1 |
| 7,168,399 B2 * | 1/2007 | Wakahara .................. | 123/41.15 |
| 7,182,048 B2 * | 2/2007 | Nakano ...................... | 123/41.1 |
| 7,207,297 B2 * | 4/2007 | Hayami ..................... | 123/41.15 |
| 8,122,858 B2 * | 2/2012 | Fujimoto .................... | 123/41.1 |
| 2004/0035194 A1* | 2/2004 | Wakahara ................... | 73/118.1 |
| 2010/0043525 A1* | 2/2010 | Recouvreur et al. ........ | 73/23.31 |
| 2010/0067560 A1* | 3/2010 | Kouda et al. ................ | 374/145 |
| 2010/0116228 A1* | 5/2010 | Fujimoto .................... | 123/41.1 |
| 2010/0307231 A1* | 12/2010 | Allard et al. ............... | 73/114.74 |

FOREIGN PATENT DOCUMENTS

| | | |
|---|---|---|
| JP | 10266858 A | 10/1998 |
| JP | 2001-073767 A | 3/2001 |
| JP | 2005207393 A | 8/2005 |

OTHER PUBLICATIONS

The Japanese Office Action issued Oct. 11, 2011 in Japanese Patent Application No. 2009-266517.

* cited by examiner

*Primary Examiner* — Eric S McCall
(74) *Attorney, Agent, or Firm* — Gifford, Krass, Sprinkle, Anderson & Citkowski, P.C.

(57) ABSTRACT

In a malfunction determination apparatus and a malfunction determination method for a cooling apparatus that cools an internal combustion engine by circulating a cooling medium that flows in a first passage that extends through an inside of the engine, using an electric pump, a first temperature of the cooling medium is detected at an inlet of the first passage, through which the cooling medium flows into the inside of the engine; a second temperature of the cooling medium is detected at an outlet of the first passage, through which the cooling medium flows out from the inside of the engine; and it is determined that the switching valve is able to normally select the second passage, if both of the first temperature and the second temperature reach a first threshold value when a temperature of the cooling medium increases due to start of the engine.

14 Claims, 5 Drawing Sheets

MALFUNCTION DETERMINATION APPARATUS FOR COOLING APPARATUS AND MALFUNCTION DETERMINATION METHOD FOR COOLING APPARATUS

CROSS REFERENCE TO RELATED APPLICATION

This application claims priority to Japanese Patent Application No. 2009-266517 filed on Nov. 24, 2009, and which is incorporated herein by reference in its entirety including the specification, drawings and abstract.

BACKGROUND OF THE INVENTION

1. Field of the Invention

The invention relates to a technology for determining whether a malfunction occurs in a cooling apparatus for an internal combustion engine, and particularly to a technology for accurately determining whether a thermostat is malfunctioning when a cooling medium, which flows through an inside of an internal combustion engine, is circulated by an electric pump.

2. Description of the Related Art

A cooling apparatus is provided for an internal combustion engine, and the cooling apparatus cools constituent components heated by heat generated by combustion. The cooling apparatus includes a thermostat. When the temperature of the cooling medium is lower than a threshold value during warming-up, the coolant is circulated so that the coolant bypasses the radiator, using the thermostat. After the temperature of the cooling medium reaches the threshold value and the warming-up is completed, the cooling medium is circulated via the radiator, using the thermostat. Thus, the internal combustion engine is quickly warmed-up, and the internal combustion engine is maintained at an appropriate temperature. However, if the thermostat is malfunctioning, for example, the opening degree of a valve in the thermostat is fixed, the cooling medium is circulated via the radiator even during the warming-up. As a result, it is not possible to quickly warm-up the internal combustion engine. Therefore, it is necessary to accurately determine whether a malfunction occurs in the cooling apparatus.

In view of the above, for example, Japanese Patent Application Publication No. 2005-207393 (JP-A-2005-207393) describes a malfunction determination apparatus for an engine cooling system, which more accurately determines whether a malfunction relating to adjustment of cooling capacity of the engine cooling system occurs. The malfunction determination apparatus determines whether a malfunction occurs in the engine cooling system in which coolant that has flowed out from a water jacket of an internal combustion engine is cooled, and then, the coolant flows into the water jacket. The malfunction determination apparatus includes determination means for determining that that a malfunction occurs when an amount of change, per unit time, in the temperature of the coolant flowing into the water jacket from the engine cooling system is equal to or larger than a predetermined determination value.

In the malfunction determination apparatus described in the above-described publication, it is possible to accurately determine that a malfunction relating to adjustment of the cooling capacity of the engine cooling system occurs.

However, when the cooling medium is circulated in a medium passage included in a cooling apparatus using an electric pump, there is a possibility of making an erroneous determination as to whether a thermostat is malfunctioning, for the following reason. In the case where the electric pump is operated when the temperature of the coolant of the internal combustion engine is equal to or higher than a predetermined value, the cooling medium that has stayed in the water jacket and heated by the operation of the internal combustion engine starts to flow due to the operation of the electric pump, and accordingly, a value detected by a sensor that detects the temperature of the cooling medium temporarily increases. Therefore, when the thermostat is malfunctioning, it may be erroneously determined that the thermostat is normally functioning.

Even in the malfunction determination apparatus described in the above-described publication, there is a possibility of making an erroneous determination relating to the thermostat due to a sharp change in an outlet temperature caused by the operation of the electric pump during warming-up, and this problem cannot be solved.

SUMMARY OF INVENTION

In view of the above, the invention provides a malfunction determination apparatus for a cooling apparatus and a malfunction determination method for a cooling apparatus, which accurately determine whether a thermostat is malfunctioning.

An aspect of the invention provides a malfunction determination apparatus for a cooling apparatus that cools an internal combustion engine by circulating a cooling medium that flows in a first passage that extends through an inside of the internal combustion engine, using an electric pump. The cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started. The malfunction determination apparatus includes an inlet temperature detection portion that detects a first temperature of the cooling medium at an inlet of the first passage, through which the cooling medium flows into the inside of the internal combustion engine; an outlet temperature detection portion that detects a second temperature of the cooling medium at an outlet of the first passage, through which the cooling medium flows out from the inside of the internal combustion engine; and a normal function determination portion that determines that the switching valve is able to normally select the second passage, if both of the first temperature and the second temperature reach a first threshold value when the temperature of the cooling medium increases due to start of the internal combustion engine.

The cooling apparatus may further include a control portion that stops the electric pump if the second temperature is lower than a second threshold value, and operates the electric pump if the second temperature is equal to or higher than the second threshold value.

The malfunction determination apparatus may further include an estimation portion that estimates the temperature of the cooling medium based on a state of the internal combustion engine after an operation of the internal combustion engine is started; and a malfunction determination portion that determines that the switching valve is malfunctioning, if the second temperature falls below a third threshold value that is equal to or lower than the first threshold value due to an operation of the electric pump, after the temperature estimated by the estimation portion reaches the first threshold value.

The control portion may operate the electric pump, independently of the operation of the internal combustion engine.

Another aspect of the invention provides a malfunction determination method for a cooling apparatus that cools an internal combustion engine by circulating a cooling medium that flows in a first passage that extends through an inside of the internal combustion engine, using an electric pump. The cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started.

The malfunction determination method includes detecting a first temperature of the cooling medium at an inlet of the first passage, through which the cooling medium flows into the inside of the internal combustion engine; detecting a second temperature of the cooling medium at an outlet of the first passage, through which the cooling medium flows out from the inside of the internal combustion engine; and determining that the switching valve is able to normally select the second passage, if both of the first temperature and the second temperature reach a threshold value when the temperature of the cooling medium increases due to start of the internal combustion engine.

In the above-described malfunction determination apparatus and malfunction determination method for the cooling apparatus, it is possible to prevent an erroneous determination due to a sharp change in the temperature of the cooling medium at the outlet of the internal combustion engine, which is caused by the operation of the electric pump during warming-up of the internal combustion engine. Thus, it is possible to accurately determine whether a malfunction occurs in the cooling apparatus.

Another aspect of the invention provides a malfunction determination apparatus for a cooling apparatus that cools an internal combustion engine by circulating a cooling medium that flows in a first passage that extends through an inside of the internal combustion engine, using an electric pump. The cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started. The malfunction determination apparatus includes an inlet temperature detection portion that detects a first temperature of the cooling medium at an inlet of the first passage, through which the cooling medium flows into the inside of the internal combustion engine; an outlet temperature detection portion that detects a second temperature of the cooling medium at an outlet of the first passage, through which the cooling medium flows out from the inside of the internal combustion engine; and a normal function determination portion that determines that the switching valve is able to normally select the second passage, if the first temperature reaches a first threshold value and the second temperature reach a fourth threshold value when the temperature of the cooling medium increases due to start of the internal combustion engine.

Another aspect of the invention provides a malfunction determination method for a cooling apparatus that cools an internal combustion engine by circulating a cooling medium that flows in a first passage that extends through an inside of the internal combustion engine, using an electric pump. The cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started.

The malfunction determination method includes detecting a first temperature of the cooling medium at an inlet of the first passage, through which the cooling medium flows into the inside of the internal combustion engine; detecting a second temperature of the cooling medium at an outlet of the first passage, through which the cooling medium flows out from the inside of the internal combustion engine; and determining that the switching valve is able to normally select the second passage, if the first temperature reaches a first threshold value and the second temperature reach a fourth threshold value when the temperature of the cooling medium increases due to start of the internal combustion engine.

In the above-described malfunction determination apparatus and malfunction determination method for the cooling apparatus, it is possible to prevent an erroneous determination due to a sharp change in the temperature of the cooling medium at the outlet of the internal combustion engine, which is caused by the operation of the electric pump during warming-up of the internal combustion engine. Thus, it is possible to more accurately determine whether a malfunction occurs in the cooling apparatus, in accordance with the configuration of the cooling apparatus.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, an embodiment of the invention will be described with reference to the drawings. In the following description, the same or corresponding components are denoted by the same reference numerals, and have the same names and the same functions, and therefore, the detailed description thereof will not be repeated.

Figure 1:
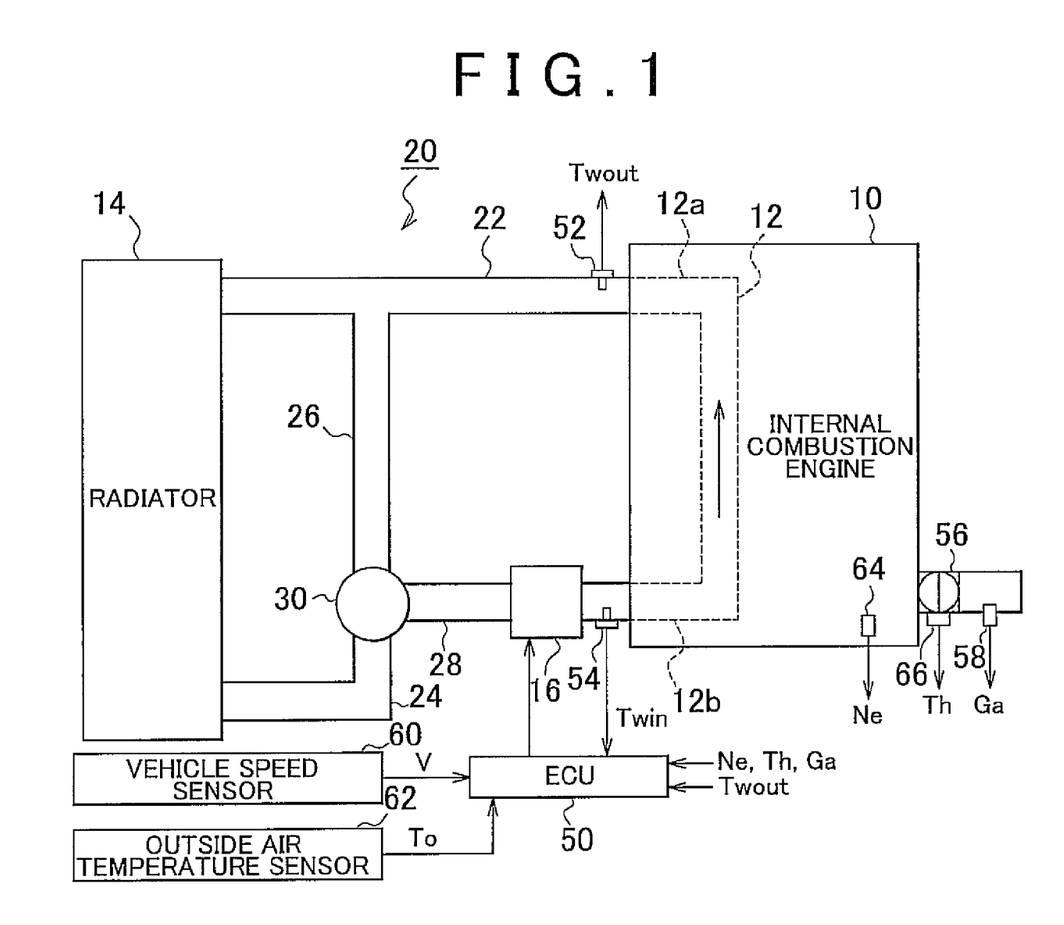
FIG. 1 is diagram showing an entire configuration of a cooling apparatus according to an embodiment.

As shown in FIG. 1, a cooling apparatus according to the embodiment includes a water jacket 12 formed inside an internal combustion engine 10; a radiator 14; a circulation passage 20 for circulating coolant between the radiator 14 and the water jacket 12; a thermostat 30 provided in the circulation passage 20; an electric water pump 16 provided in the circulation passage 20; and an Electronic Control Unit (ECU) 50. A malfunction determination apparatus for the cooling apparatus according to the embodiment is implemented by the ECU 50. The cooling apparatus and the internal combustion engine in the embodiment are provided in a vehicle. The vehicle is not limited to a specific vehicle, as long as the internal combustion engine is used as a power source in the vehicle. For example, the vehicle is a hybrid vehicle.

The thermostat 30 includes a valve whose opening amount changes according to the temperature of a cooling medium that contacts the valve. The flow rate of the cooling medium that passes through the radiator 14 is automatically adjusted by opening and closing the valve. In the following description, the cooling medium is the coolant. However, the cooling medium may be liquid or gas, and the cooling medium is not limited to the coolant.

The circulation passage 20 includes a passage 22 for supplying the coolant from the water jacket 12 to the radiator 14; a passage 24 for supplying the coolant, which has been cooled by the radiator 14, to the water jacket 12 via the thermostat 30; a bypass passage 26 which extends from the passage 22, and which is used for supplying the coolant, which does not pass through the radiator 14, to the water jacket 12 via the thermostat 30; and a passage 28 for supplying selected one of the coolant supplied from the passage 24 and the coolant supplied from the bypass passage 26 to the water jacket 12, or supplying both of the coolant supplied from the passage 24 and the coolant supplied from the bypass passage 26 to the water jacket 12.

The thermostat 30 is provided in the circulation passage 20 at a confluence portion at which the passage 24 is joined to the bypass passage 26. In the embodiment, when the temperature of the coolant is lower than a predetermined temperature, the thermostat 30 interrupts the flow of the coolant from the passage 24 to the passage 28, and provides communication between the bypass passage 26 and the passage 28. In this case, if the electric water pump 16 is operating, the coolant is circulated in the circulation passage 20 so that the coolant bypasses the radiator 14. When the temperature of the coolant is equal to or higher than the predetermined temperature, the thermostat 30 increases the flow rate of the coolant flowing from the passage 24 to the passage 28. In this case, if the water pump 16 is operating, the coolant is circulated in the circulation passage 20 via the radiator 14.

The electric water pump 16 is provided in the passage 28, and forcibly causes the coolant in the circulation passage 20 to flow to the water jacket 12 through the passage 28. The flow rate of the electric water pump 16 is adjusted according to a control signal from the ECU 50.

The ECU 50 is connected to an outlet temperature sensor 52, an inlet temperature sensor 54, an airflow meter 58, a vehicle speed sensor 60, an outside air temperature sensor 62, a rotational speed sensor 64, and a throttle sensor 66.

The outlet temperature sensor 52 is provided near an outlet 12a through which the coolant flows out from the water jacket 12 to the passage 22. The outlet temperature sensor 52 detects the temperature of the coolant flowing in the passage 22 (hereinafter, referred to as "outlet temperature Twout"). The outlet temperature sensor 52 transmits a signal indicating the detected outlet temperature Twout, to the ECU 50.

The inlet temperature sensor 54 is provided near an inlet 12b through which the coolant flows into the water jacket 12. The inlet temperature sensor 54 detects the temperature of the coolant flowing in the passage 28 (hereinafter, referred to as "inlet temperature Twin"). The inlet temperature sensor 54 transmits a signal indicating the detected inlet temperature Twin, to the ECU 50.

The airflow meter 58 detects an intake air amount Ga. The airflow meter 58 transmits a signal indicating the detected intake air amount Ga, to the ECU 50.

The vehicle speed sensor 60 detects a vehicle speed V. The vehicle speed sensor 60 transmits a signal indicating the detected vehicle speed V, to the ECU 50.

The outside air temperature sensor 62 detects an outside air temperature To that is the temperature of air outside the vehicle. The outside air temperature sensor 62 transmits a signal indicating the detected outside air temperature To, to the ECU 50.

The rotational speed sensor 64 detects a rotational speed N of an output shaft of the internal combustion engine 10. The rotational speed sensor 64 transmits a signal indicating the detected rotational speed Ne of the output shaft of the internal combustion engine 10, to the ECU 50.

The throttle sensor 66 detects an opening degree Th of a throttle valve 56 (hereinafter, referred to as "throttle opening degree Th"). The throttle sensor 66 transmits a signal indicating the detected throttle opening degree Th, to the ECU 50.

The ECU 50 receives signals from the sensors, and executes programs such as a program for a malfunction determination process.

In the cooling apparatus with the above-described configuration, the ECU 50 determines whether the thermostat 30 is malfunctioning, based on the state of the vehicle that is determined based on the signals from the sensors, during warming-up after the internal combustion engine 10 is started.

For example, in the case where the coolant is circulated in the circulation passage 20 by starting the electric water pump 16 at the start of the internal combustion engine 10, the ECU 50 estimates the outlet temperature based on the state of the vehicle, and determines whether the thermostat 30 is malfunctioning based on the result of comparison between the estimated temperature (hereinafter, referred to as "simulated temperature Ts") and the outlet temperature Twout.

After the operation of the internal combustion engine 10 is started, the ECU 50 calculates an amount of change in the temperature based on the state of the vehicle, using the outside air temperature To at the time of start of the internal combustion engine 10 as an initial value. Then, the ECU 50 calculates the simulated temperature Ts by adding the calculated amount of change to the initial value.

For example, the ECU 50 calculates an amount of heat generated per one calculation cycle and an amount of heat released per one calculation cycle, based on the intake air amount Ga, the vehicle speed V, and the operating state of the internal combustion engine 10, and thus, calculates an estimated amount of change in the outlet temperature in each calculation cycle, using a map, a mathematical formula, or the like. It is preferable that the simulated temperature Ts in each calculation cycle should be lower than a lower limit of possible values of the outlet temperature in the calculation cycle when the thermostat 30 is normally functioning.

Figure 2:
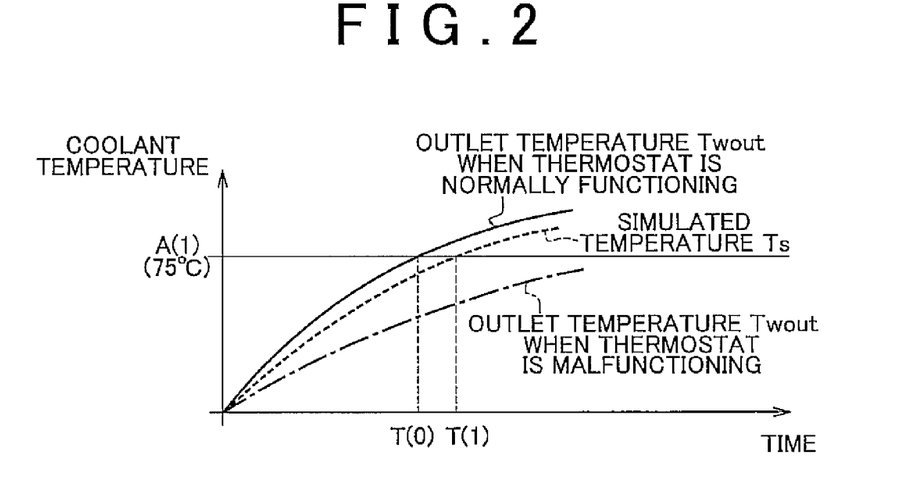
FIG. 2 is a timing chart showing changes in an outlet temperature and a simulated temperature in the case where an electric water pump is started at the start of an internal combustion engine.

FIG. 2 shows examples of time-dependent changes in the simulated temperature Ts and the outlet temperature Twout in the case where the coolant is circulated in the circulation passage 20 by starting the electric water pump 16 at the start of the operation of the internal combustion engine. In FIG. 2, an axis of ordinate indicates the temperature of the coolant, and an axis of abscissas indicates time.

If the outlet temperature Twout indicated by a solid line in FIG. 2 reaches a threshold value A (1) at a time point T (0) before the simulated temperature Ts indicated by a dash line in FIG. 2 reaches the threshold value A (1), the ECU 50 determines that the thermostat 30 is normally functioning.

If the simulated temperature Ts indicated by the dash line in FIG. 2 reaches the threshold value A (1) at a time point T (1) before the outlet temperature Twout indicated by a chain line in FIG. 2 reaches the threshold value A (1), the ECU 50 determines that the thermostat 30 is malfunctioning. The phrase "the thermostat 30 is malfunctioning" signifies that the opening degree of the valve inside the thermostat 30 is fixed, and the coolant is circulated in the circulation passage 20 via the radiator 14 although the temperature of the coolant is low. The threshold value A (1) is, for example, 75° C. However, the threshold value A (1) is not limited to 75° C.

However, when the coolant is circulated in the circulation passage 20 by operating the electric water pump 16 during warming-up of the internal combustion engine, the ECU 50 may make an erroneous determination as to whether the thermostat 30 is malfunctioning.

When the outlet temperature Twout is equal to or higher than a threshold value A (2) after the operation of the internal combustion engine 10 is started, the ECU 50 operates the electric water pump 16 to circulate the coolant in the circulation passage 20. The threshold value A (2) is lower than the threshold value A (1). The threshold value A (2) is, for example, 70° C. However, the threshold value A (2) is not limited to 70° C. After the operation of the electric water pump 16 is started, the ECU 50 may continue the operation of the electric water pump 16 until the internal combustion engine 10 is stopped, or the ECU 50 may stop the operation of the electric water pump 16 when the outlet temperature Twout falls below the threshold value A (2).

Figure 3:
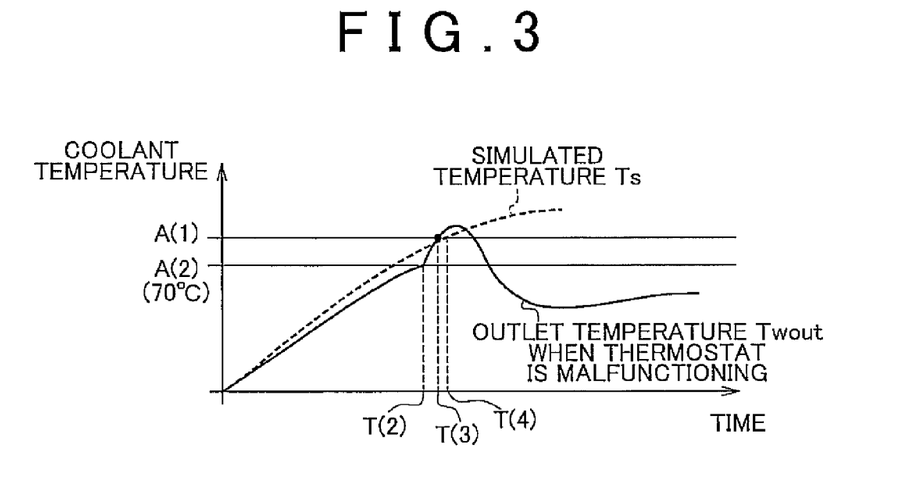
FIG. 3 is a timing chart showing changes in the outlet temperature and the simulated temperature in the case where the electric water pump is operated during warming-up of the internal combustion engine.

FIG. 3 shows examples of time-dependent changes in the simulated temperature Ts and the outlet temperature Twout in the case where the electric water pump 16 is operated when the outlet temperature Twout is equal to or higher than the threshold value A (2) after the operation of the internal combustion engine 10 is started. In FIG. 3, an axis of ordinate indicates the temperature of the coolant, and an axis of abscissas indicates time.

The following description is made on the assumption that for example, the coolant flows in the circulation passage 20 via the radiator 14 although the temperature of the coolant is low, because the degree of the valve inside the thermostat 30 is fixed.

After the operation of the internal combustion engine 10 is started, heat generated due to the operation of the internal combustion engine 10 transfers to the coolant that stays around the outlet temperature sensor 52. Therefore, the outlet temperature Twout increases.

When the outlet temperature Twout increases to the threshold value A (2) at a time point T (2), the ECU 50 operates the electric water pump 16. After the operation of the electric water pump 16 is started, the coolant that has stayed in the water jacket 12 inside the internal combustion engine 10 starts to flow to the circulation passage 20. The coolant that has stayed in the water jacket 12 has been heated by heat generated by the operation of the internal combustion engine 10. Therefore, the temperature of the coolant that has stayed in the water jacket 12 is higher than the temperature of the coolant that has stayed in the circulation passage 20.

Therefore, when the coolant that has stayed in the water jacket 12 passes the outlet temperature sensor 52, the outlet temperature Twout temporarily exceeds the threshold value A (1). Thus, because the outlet temperature Twout reaches the threshold value A (1) before a time point T (4) at which the simulated temperature Ts reaches the threshold value A (1), the ECU 50 determines that the thermostat 30 is normally functioning.

However, the coolant flowing from the internal combustion engine 10 to the circulation passage 20 passes through the radiator 14 due to the malfunction of the thermostat 30, and therefore, the coolant is cooled by the radiator 14. Because the coolant, which has been cooled by the radiator 14, is circulated to the internal combustion engine 10, the outlet temperature Twout falls below the threshold value A (1) and the threshold value A (2). Thus, there is a possibility that the ECU 50 may erroneously determine that the thermostat 30 is normally functioning although the thermostat 30 is malfunctioning.

Accordingly, in the embodiment, if both of the outlet temperature Twout and the inlet temperature Twin reach respective threshold values indicating that the thermostat 30 is normally functioning during warming-up of the internal combustion engine 10, the ECU 50 determines that the thermostat 30 is able to normally select the bypass passage 26.

If the outlet temperature Twout is lower than the threshold value A (1), and the simulated temperature Ts is equal to or higher than the threshold value A (1), the ECU 50 determines that the thermostat 30 is malfunctioning. The phrase "during warming-up of the internal combustion engine 10" signifies, for example, a state in which at least one of the inlet temperature Twin and the outlet temperature Twout is lower than a predetermined temperature after the internal combustion engine 10 is started.

Figure 4:
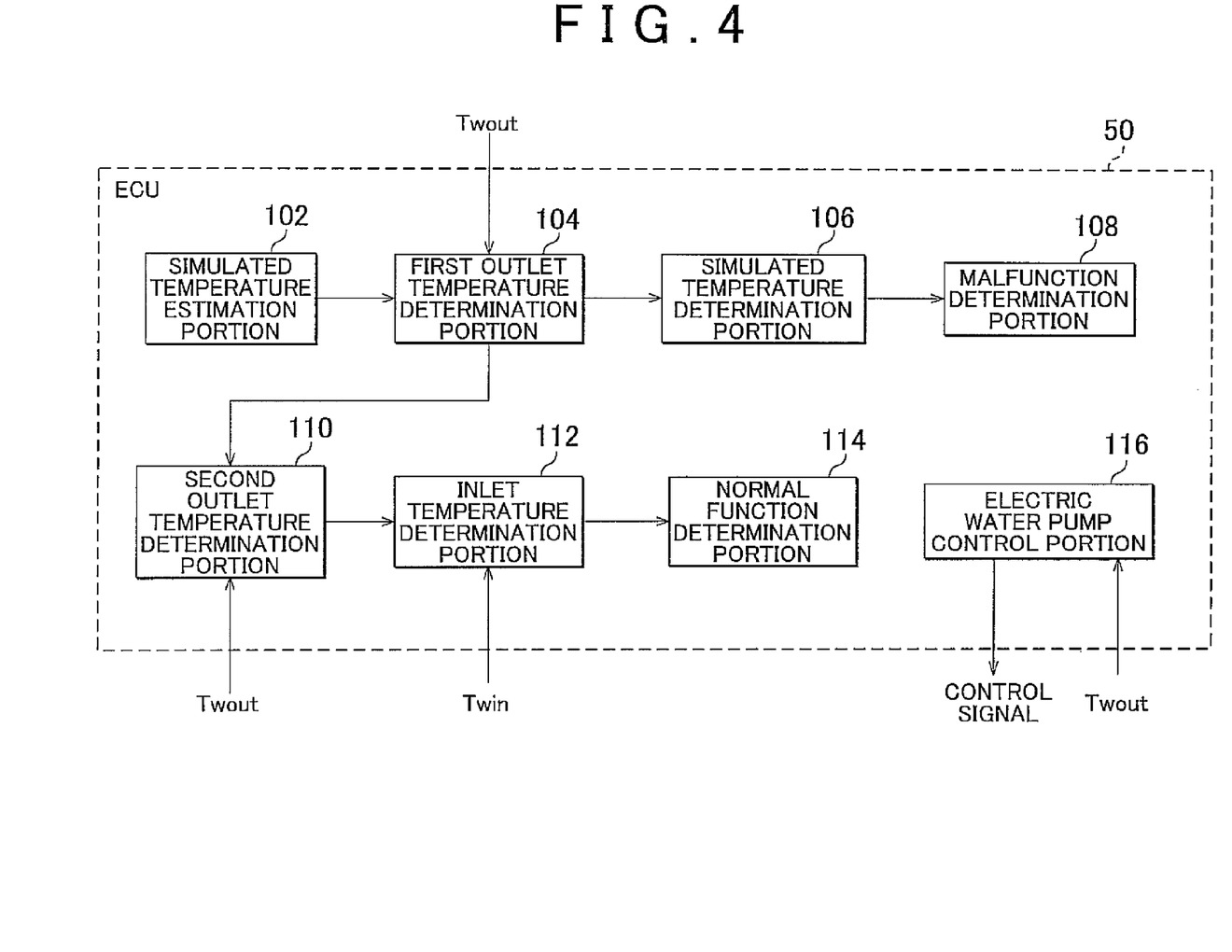
FIG. 4 is a functional block diagram of an ECU that is a malfunction determination apparatus for the cooling apparatus according to the embodiment.

FIG. 4 is a functional block diagram of the ECU 50 in the embodiment. The ECU 50 includes a simulated temperature estimation portion 102, a first outlet temperature determination portion 104, a simulated temperature determination portion 106, a malfunction determination portion 108, a second outlet temperature determination portion 110, an inlet temperature determination portion 112, a normal function determination portion 114, and an electric water pump control portion 116.

The malfunction determination apparatus for the cooling apparatus according to the embodiment is implemented by the simulated temperature estimation portion 102, the first outlet temperature determination portion 104, the simulated temperature determination portion 106, the malfunction determination portion 108, the second outlet temperature determination portion 110, the inlet temperature determination portion 112, and the normal function determination portion 114 of the ECU 50.

The simulated temperature estimation portion 102 estimates the simulated temperature Ts of the outlet temperature. The simulated temperature estimation portion 102 estimates the simulated temperature Ts based on the state of the vehicle after the operation of the internal combustion engine 10 is started.

The phrase "the state of the vehicle" signifies, for example, the vehicle speed V and the state of the internal combustion engine 10. The phrase "the state of the internal combustion engine" signifies the intake air amount Ga and the throttle opening degree Th. The phrase "the state of the internal combustion engine" also signifies whether fuel supply is cut off, whether the internal combustion engine is idling, and whether the electric water pump 16 is operating.

The simulated temperature estimation portion 102 calculates the amount of change in the temperature based on the above-described state of the vehicle in each calculation cycle, using the outside air temperature To at the time of start of the internal combustion engine 10 as the initial temperature, and estimates the simulated temperature Ts by adding the calculated amount of change in the temperature to the initial value. The simulated temperature estimation portion 102 calculates the amount of change in the temperature from the amount of heat generated in the internal combustion engine 10 and the amount of heat released from the internal combustion engine 10, based on the state of the vehicle and using a map, a mathematical formula, or the like.

The first outlet temperature determination portion 104 determines whether the outlet temperature Twout is equal to or higher than the threshold value A (2). For example, the first outlet temperature determination portion 104 may turn on a first outlet temperature determination flag, when the outlet temperature Twout is equal to or higher than the threshold value A (2). The first outlet temperature determination portion 104 determines whether the outlet temperature Twout is equal to or higher than the threshold value A (2) after the operation of the internal combustion engine 10 is started. Because the threshold value A (2) has been described above, the description thereof is not repeated.

If the first outlet temperature determination portion 104 determines that the outlet temperature Twout is lower than the threshold value A (2), the simulated temperature determination portion 106 determines whether the simulated temperature Ts is equal to or higher than the threshold value A (1).

For example, the simulated temperature determination portion 106 may turn on a simulated temperature determination flag, when the simulated temperature Ts is equal to or higher than the threshold value A (1).

If the simulated temperature determination portion 106 determines that the simulated temperature Ts is equal to or higher than the threshold value A (1), the malfunction determination portion 108 determines that the thermostat 30 is malfunctioning. The malfunction determination portion 108 may notify a user that the thermostat 30 is malfunctioning. In this case, the notification may be provided by generating voice or warning sound, or displaying the notification in a meter or a display device of a navigation system or the like.

For example, the malfunction determination portion 108 may determine that the thermostat 30 is malfunctioning, when the first outlet temperature determination flag is off, and the simulated temperature determination flag is on.

If the first outlet temperature determination portion 104 determines that the outlet temperature Twout is equal to or higher than the threshold value A (2), the second outlet temperature determination portion 110 determines whether the outlet temperature Twout is equal to or higher than the threshold value A (1). Because the threshold value A (1) has been described above, the detailed description thereof is not repeated.

For example, the second outlet temperature determination portion 110 may determine whether the outlet temperature Twout is equal to or higher than the threshold value A (1) when the first outlet temperature determination flag is on, and may turn on a second outlet temperature determination flag when it is determined that the outlet temperature Twout is equal to or higher than the threshold value A (1).

If the outlet temperature Twout is equal to or higher than the threshold value A (1), the inlet temperature determination portion 112 determines whether the inlet temperature Twin is equal to or higher than a threshold value A (3). For example, the threshold value A (3) is the same value as the threshold value A (1). However, the threshold value A (3) is not limited to the same value as the threshold value A (1). For example, the inlet temperature determination portion 112 may determine whether the inlet temperature Twin is equal to or higher than the threshold value A (3) when the second outlet temperature determination flag is on, and may turn on an inlet temperature determination flag when it is determined that the inlet temperature Twin is equal to or higher than the threshold value A (3).

The normal function determination portion 114 determines that the thermostat 30 is normally functioning, when the outlet temperature Twout is equal to or higher than the threshold value A (1), and the inlet temperature determination portion 112 determines that the inlet temperature Twin is equal to or higher than the threshold value A (3). For example, the normal function determination portion 114 may notify a user that the thermostat 30 is normally functioning. Because the methods for providing the notification have been described, the detailed description thereof is not repeated. For example, the normal function determination portion 114 may determine that the thermostat 30 is normally functioning if both of the second outlet temperature determination flag and the inlet temperature determination flag are on.

The electric water pump control portion 116 stops the electric water pump 16 when the outlet temperature Twout is lower than the threshold value A (2), and operates the electric water pump 16 when the outlet temperature Twout is equal to or higher than the threshold value A (2). In the embodiment, the electric water pump control portion 116 transmits a control signal to the electric water pump 16 so that when the outlet temperature Twout is lower than the threshold value A (2) at the time of start of the internal combustion engine 10, the electric water pump 16 is not operated, and when the outlet temperature Twout is equal to or higher than the threshold value A (2) due to the start of the internal combustion engine 10, the operation of the electric water pump 16 is started. The electric water pump control portion 116 operates the electric pump 16 independently of the operation of the internal combustion engine 10.

In the embodiment, the simulated temperature estimation portion 102, the first outlet temperature determination portion 104, the simulated temperature determination portion 106, the malfunction determination portion 108, the second outlet temperature determination portion 110, the inlet temperature determination portion 112, the normal function determination portion 114, and the electric water pump control portion 116 are implemented when a CPU of the ECU 50 executes a program stored in memory. The following description is made on the assumption that the above-described portions function as software. However, the above-described portions may be implemented by hardware. The program is stored in a storage medium, and provided in the vehicle.

Figure 5:
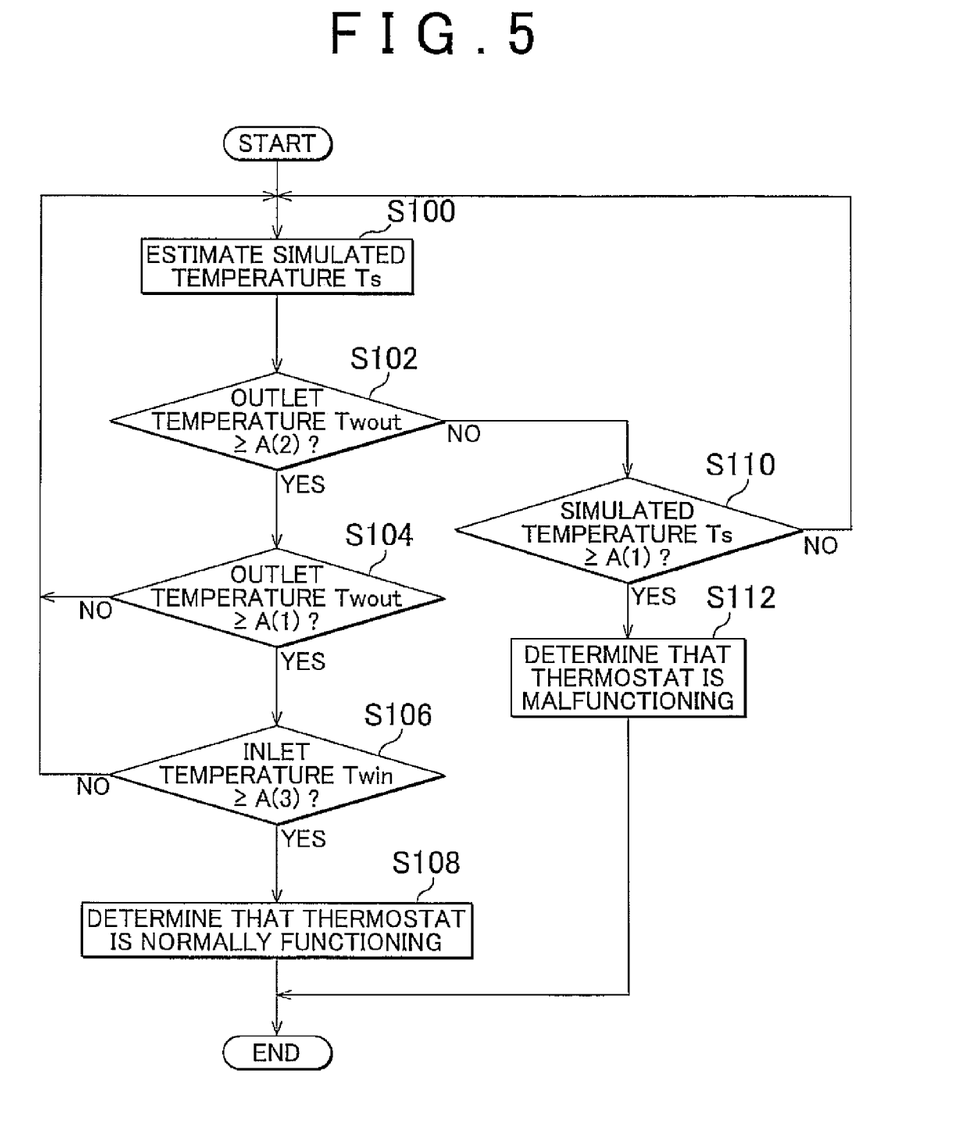
FIG. 5 is a flowchart showing a control structure of a program executed by the ECU that is the malfunction determination apparatus for the cooling apparatus according to the embodiment.

The control structure of the program, which is executed by the ECU 50 that is the malfunction determination apparatus for the cooling apparatus according to the invention, will be described with reference to FIG. 5. For example, the ECU 50 may execute a program that determines whether the thermostat 30 is malfunctioning, when an execution condition that the temperature of the coolant is equal to or lower than a predetermined temperature is satisfied at the time of start of the internal combustion engine 10.

In step (hereinafter, simply referred to as "S") 100, the ECU 50 estimates the simulated temperature Ts. In S102, the ECU 50 determines whether the outlet temperature Twout is equal to or higher than the threshold value A (2). If the outlet temperature Twout is equal to or higher than the threshold value A (2) (YES in S102), the routine proceeds to S104. If the outlet temperature Twout is lower than the threshold value A (2) (NO in S102), the routine proceeds to S110.

In S104, the ECU 50 determines whether the outlet temperature Twout is equal to or higher than the threshold value A (1). If the outlet temperature Twout is equal to or higher than the threshold value A (1) (YES in S104), the routine proceeds to S106. If the outlet temperature Twout is lower than the threshold value A (1) (NO in S104), the routine returns to S100.

In S106, the ECU 50 determines whether the inlet temperature Twin is equal to or higher than the threshold value A (3). If the inlet temperature Twin is equal to or higher than the threshold value A (3) (YES in S106), the routine proceeds to S108. If the inlet temperature Twin is lower than the threshold value A (3) (NO in S106), the routine returns to S100.

In S108, the ECU 50 determines that the thermostat 30 is normally functioning. If a negative determination is made in S102, the ECU 50 determines whether the simulated temperature Ts is equal to or higher than the threshold value A (1) in S110. If the simulated temperature Ts is equal to or higher than the threshold value A (1) (YES in S110), the routine proceeds to S112. If the simulated temperature Ts is lower than the threshold value A (1) (NO in S110), the routine returns to S100. In S112, the ECU 50 determines that the thermostat 30 is malfunctioning.

The operation of the ECU 50, which is the malfunction determination apparatus for the cooling apparatus according to the embodiment, based on the above-described control structure and flowchart, will be described using FIGS. 6A and 6B.

First, a case where the thermostat 30 is malfunctioning will be described. The following description is made on the assumption that, for example, the opening degree of the valve in the thermostat 30 is fixed so that the coolant is circulated via the radiator 14. When the outlet temperature Twout is lower than the threshold value A (2) (70° C.) after the operation of the internal combustion engine 10 is started, the electric water pump 16 remains stopped. The coolant, which stays in the water jacket 12, is heated by heat generated due to the operation of the internal combustion engine 10. The temperature of the coolant in the water jacket 12 increases, and the heat of the coolant in the water jacket 12 transfers to the coolant that stays in the circulation passage 20. Accordingly, the temperature around the inlet temperature sensor 54 and the temperature around the outlet temperature sensor 52 increase, that is, the inlet temperature Twin and the outlet temperature Twout increase. The simulated temperature Ts is calculated based on the state of the vehicle at the start of the operation of the internal combustion engine 10 (S100). As time passes, the simulated temperature Ts increases in a manner similar to a manner in which the outlet temperature Twout changes.

Figure 6A:
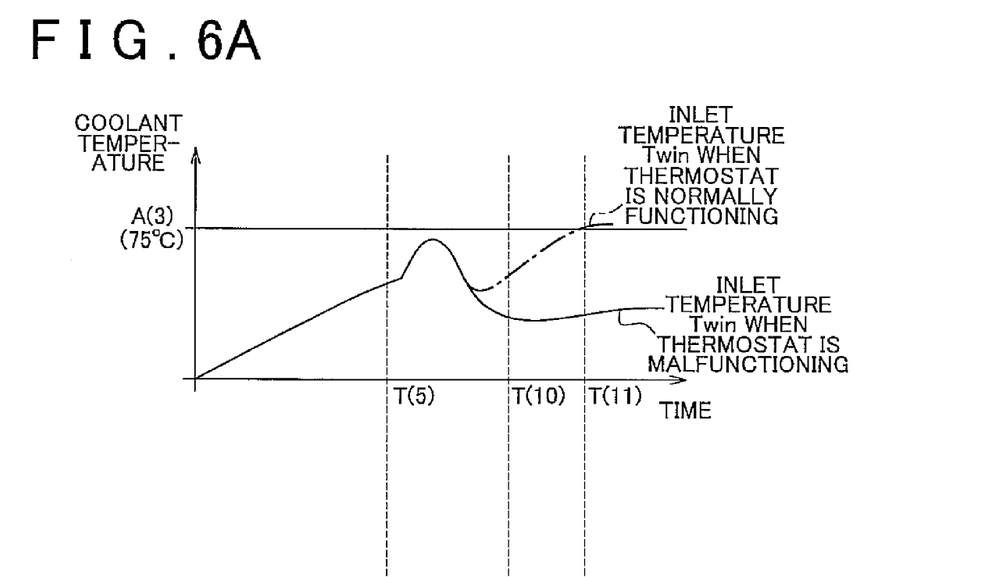
FIGS. 6A and 6B are timing charts each showing an operation of the ECU that is the malfunction determination apparatus for the cooling apparatus according to the embodiment.
Figure 6B:
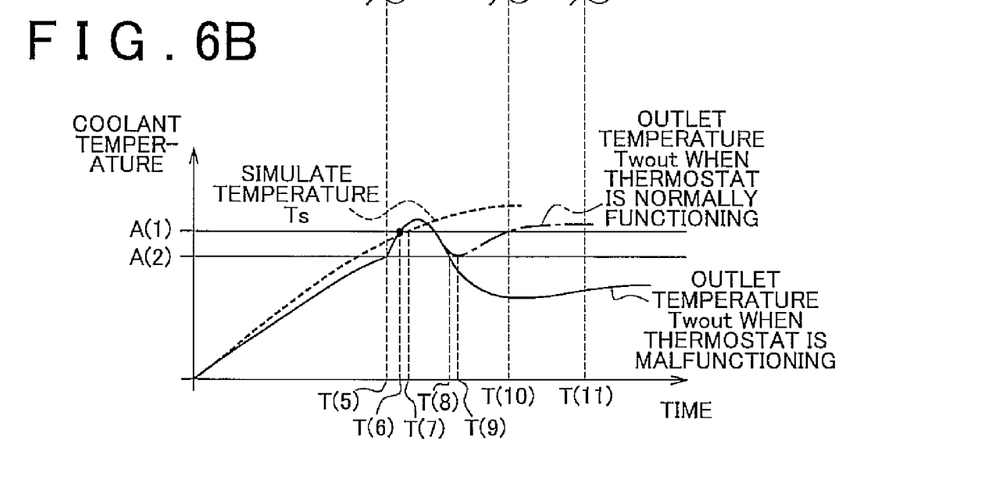

When the outlet temperature Twout is equal to or higher than the threshold value A (2) at a time point T (5) as indicated by a solid line in the timing chart in FIG. 6B (YES in S102), it is determined whether the outlet temperature Twout is equal to or higher than the threshold value A (1) (75° C.) (S104). Also, the ECU 50 operates the electric water pump 106 at the time point T (5). When the operation of the electric water pump 16 is started, the coolant that has stayed in the water jacket 12 of the internal combustion engine 10 starts to flow.

The temperature of the coolant that has stayed in the water jacket 12 is higher than the temperature of the coolant that has stayed in the circulation passage 20. Therefore, when the coolant that has stayed in the water jacket 12 passes the outlet temperature sensor 52, the outlet temperature Twout temporarily exceeds the threshold value A (1) at a time point T (6) (YES in S104). Also, the simulated temperature Ts exceeds the threshold value A (1) at a time point T (7).

The coolant, which has passed the outlet temperature sensor 52, flows through the radiator 14 due to the malfunction of the thermostat 30. Because the distribution of the coolant temperature becomes uniform after the coolant starts to flow, and the coolant is cooled by the radiator 14, the temperature of the coolant decreases. As a result, the inlet temperature Twin does not exceed the threshold value A (3) (75° C.) (NO in S106).

Because the coolant cooled by the radiator 14 flows in the water jacket 12 of the internal combustion engine 10, the outlet temperature Twout becomes equal to or lower than the threshold value A (2) (70° C.) at a time point T (8). When the simulated temperature Ts is estimated (S100) at the time point T (8), because the outlet temperature Twout is equal to or lower than the threshold value A (2) (NO in S102), and the estimated simulated temperature Ts is equal to or higher than the threshold value A (1) (YES in S110), it is determined that the thermostat 30 is malfunctioning (S112).

Next, a case where the thermostat 30 is normally functioning will be described. The changes in the inlet temperature Twin, the outlet temperature Twout, and the simulated temperature Ts at the start of the operation of the internal combustion engine 10 are the same as the above-described changes in the inlet temperature Twin, the outlet temperature Twout, and the simulated temperature Ts until the time point T (7) when the thermostat 30 is malfunctioning, and therefore, the detailed description thereof is not repeated.

As shown by a chain line in FIG. 6B, when the thermostat 30 is normally functioning, the coolant that has stayed in the water jacket 12 does not flow through the radiator 14. Therefore, as compared to when the thermostat 30 is malfunctioning, the degree of decrease in the outlet temperature Twout is small. Accordingly, the outlet temperature Twout does not fall below the threshold value A (2), and starts to increase at a time point T (9).

As shown by the chain lines in FIGS. 6A and 6B, at a time point T (10), the outlet temperature Twout is higher than the threshold value A (1) and the threshold value A (2) (YES in S102, and YES in S104), and the inlet temperature Twin is lower than the threshold value A (3) (75° C.) (NO in S106). Therefore, the determination as to whether the thermostat 30 is normally functioning is suspended. At a time point T (11), the outer temperature Twout is higher than the threshold value A (1) and the threshold value A (2) (YES in S102, and YES in S104), and the inlet temperature Twin is equal to or higher than the threshold value A (3) (YES in S106). Therefore, it is determined that the thermostat 30 is normally functioning.

As described above, in the malfunction determination apparatus for the cooling apparatus according to the embodiment, if both of the inlet temperature Twin and the outlet temperature Twout reach the respective threshold values indicating that the thermostat is normally functioning during warming-up of the internal combustion engine, it is determined that the thermostat is normally functioning. Accordingly, even when the electric water is operated during warming-up, it is possible to accurately determine whether the thermostat is malfunctioning. Thus, it is possible to provide the malfunction determination apparatus for the cooling apparatus and the malfunction determination method for the cooling apparatus, which accurately determine whether the thermostat is malfunctioning.

In the embodiment, if the outlet temperature Twout falls below the threshold value A (2), at which the operation of the electric water pump is started, due to the operation of the electric water pump after the simulated temperature Ts reaches the threshold value A (1), it is determined that the thermostat is malfunctioning. However, the threshold value for the outlet temperature Twout, which is used to determine whether the thermostat is malfunctioning after the simulated temperature Ts reaches the threshold value A (1), is not limited to the threshold value A (2), as long as the threshold value is equal to or lower than the threshold value A (1).

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A malfunction determination apparatus for a cooling apparatus that cools an internal combustion engine by circulating a cooling medium that flows in a first passage that extends through an inside of the internal combustion engine, using an electric pump, wherein the cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started, the malfunction determination apparatus comprising:
   an inlet temperature detection portion that detects a first temperature of the cooling medium at an inlet of the first passage, through which the cooling medium flows into the inside of the internal combustion engine;
   an outlet temperature detection portion that detects a second temperature of the cooling medium at an outlet of the first passage, through which the cooling medium flows out from the inside of the internal combustion engine; and
   a normal function determination portion that determines that the switching valve is able to normally select the second passage, if both of the first temperature and the second temperature reach a first threshold value when the temperature of the cooling medium increases due to start of the internal combustion engine.

2. The malfunction determination apparatus according to claim 1, wherein the inlet temperature detection portion that detects the first temperature of the cooling medium at the inlet of the first passage, through which the cooling medium flows into the inside of the internal combustion engine, is positioned between the switching valve and the internal combustion engine.

3. The malfunction determination apparatus according to claim 1, further comprising:
   a control portion that stops the electric pump if the second temperature is lower than a second threshold value, and operates the electric pump if the second temperature is equal to or higher than the second threshold value.

4. The malfunction determination apparatus according to claim 3, further comprising:
   an estimation portion that estimates the temperature of the cooling medium based on a state of the internal combustion engine after an operation of the internal combustion engine is started; and
   a malfunction determination portion that determines that the switching valve is malfunctioning, if the second temperature falls below a third threshold value that is equal to or lower than the first threshold value due to an operation of the electric pump, after the temperature estimated by the estimation portion reaches the first threshold value.

5. The malfunction determination apparatus according to claim 4, wherein
   the control portion operates the electric pump, independently of the operation of the internal combustion engine.

6. A malfunction determination method for a cooling apparatus that cools an internal combustion engine by circulating a cooling medium that flows in a first passage that extends through an inside of the internal combustion engine, using an electric pump, wherein the cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started, the malfunction determination method comprising:
   detecting a first temperature of the cooling medium at an inlet of the first passage, through which the cooling medium flows into the inside of the internal combustion engine;
   detecting a second temperature of the cooling medium at an outlet of the first passage, through which the cooling medium flows out from the inside of the internal combustion engine; and
   determining that the switching valve is able to normally select the second passage, if both of the first temperature and the second temperature reach a threshold value when the temperature of the cooling medium increases due to start of the internal combustion engine.

7. The malfunction determination method according to claim 6, wherein the first temperature of the cooling medium at the inlet of the first passage, through which the cooling medium flows into the inside of the internal combustion engine, is detected between the switching valve and the internal combustion engine.

8. A malfunction determination apparatus for a cooling apparatus that cools an internal combustion engine by circulating a cooling medium that flows in a first passage that extends through an inside of the internal combustion engine, using an electric pump, wherein the cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started, the malfunction determination apparatus comprising:

an inlet temperature detection portion that detects a first temperature of the cooling medium at an inlet of the first passage, through which the cooling medium flows into the inside of the internal combustion engine;

an outlet temperature detection portion that detects a second temperature of the cooling medium at an outlet of the first passage, through which the cooling medium flows out from the inside of the internal combustion engine; and a normal function determination portion that determines that the switching valve is able to normally select the second passage, if the first temperature reaches a first threshold value and the second temperature reach a fourth threshold value when the temperature of the cooling medium increases due to start of the internal combustion engine.

9. The malfunction determination apparatus according to claim 8, wherein the inlet temperature detection portion that detects the first temperature of the cooling medium at the inlet of the first passage, through which the cooling medium flows into the inside of the internal combustion engine, is positioned between the switching valve and the internal combustion engine.

10. The malfunction determination apparatus according to claim 8, further comprising:

a control portion that stops the electric pump if the second temperature is lower than a second threshold value, and operates the electric pump if the second temperature is equal to or higher than the second threshold value.

11. The malfunction determination apparatus according to claim 10, further comprising:

an estimation portion that estimates the temperature of the cooling medium based on a state of the internal combustion engine after an operation of the internal combustion engine is started; and a malfunction determination portion that determines that the switching valve is malfunctioning, if the second temperature falls below a third threshold value that is equal to or lower than the first threshold value due to an operation of the electric pump, after the temperature estimated by the estimation portion reaches the first threshold value.

12. The malfunction determination apparatus according to claim 11, wherein the control portion operates the electric pump, independently of the operation of the internal combustion engine.

13. A malfunction determination method for a cooling apparatus that cools an internal combustion engine by circulating a cooling medium that flows in a first passage that extends through an inside of the internal combustion engine, using an electric pump, wherein the cooling apparatus includes a radiator, a second passage for circulating the cooling medium to the first passage so that the cooling medium bypasses the radiator, a third passage for circulating the cooling medium to the first passage via the radiator, and a switching valve that switches a flow passage for the cooling medium from a flow passage including the second passage to a flow passage including the third passage, in response to an increase in a temperature of the cooling medium after the internal combustion engine is started, the malfunction determination method comprising:

detecting a first temperature of the cooling medium at an inlet of the first passage, through which the cooling medium flows into the inside of the internal combustion engine;

detecting a second temperature of the cooling medium at an outlet of the first passage, through which the cooling medium flows out from the inside of the internal combustion engine; and determining that the switching valve is able to normally select the second passage, if the first temperature reaches a first threshold value and the second temperature reach a fourth threshold value when the temperature of the cooling medium increases due to start of the internal combustion engine.

14. The malfunction determination method according to claim 13, wherein the first temperature of the cooling medium at the inlet of the first passage, through which the cooling medium flows into the inside of the internal combustion engine, is detected between the switching valve and the internal combustion engine.

* * * * *